US008250191B2

(12) United States Patent
Hickmott et al.

(10) Patent No.: US 8,250,191 B2
(45) Date of Patent: Aug. 21, 2012

(54) METHODS AND APPARATUS FOR COOPERATIVE FILE DISTRIBUTION WITH TARGET DATA DELIVERY RATE

(75) Inventors: Andrew Hickmott, New York, NY (US); Laird A. Popkin, West Orange, NJ (US)

(73) Assignee: Pando Networks, Inc., New York, NY (US)

( * ) Notice: Subject to any disclaimer, the term of this patent is extended or adjusted under 35 U.S.C. 154(b) by 213 days.

(21) Appl. No.: 11/850,793

(22) Filed: Sep. 6, 2007

(65) Prior Publication Data
US 2009/0070482 A1 Mar. 12, 2009

(51) Int. Cl.
G06F 15/173 (2006.01)
G01R 31/08 (2006.01)
H04B 7/185 (2006.01)
H04B 1/38 (2006.01)
H04L 12/28 (2006.01)
(52) U.S. Cl. ........ 709/223; 370/235; 370/318; 370/412; 375/222
(58) Field of Classification Search .......... 709/223–225, 709/230–236
See application file for complete search history.

(56) References Cited

U.S. PATENT DOCUMENTS

| 5,941,951 | A * | 8/1999 | Day et al. ............. 709/233 |
| 2002/0080721 | A1 * | 6/2002 | Tobagi et al. ............. 370/236 |
| 2003/0204602 | A1 | 10/2003 | Hudson et al. |
| 2004/0148344 | A1 | 7/2004 | Navar et al. |
| 2004/0172476 | A1 | 9/2004 | Chapweske |
| 2006/0190589 | A1 * | 8/2006 | Parker ............. 709/224 |
| 2008/0037438 | A1 * | 2/2008 | Twiss et al. .......... 370/252 |
| 2008/0040501 | A1 * | 2/2008 | Harrang et al. ......... 709/232 |

FOREIGN PATENT DOCUMENTS

GB 2 440 774 2/2008

OTHER PUBLICATIONS

Dongyan Xu et at. Analysis of a CDN-P2P hybrid architecture for cost-effestive streaming media distribution, 2006; Springer-verleg2006; 383-399.*

* cited by examiner

Primary Examiner — Haresh N Patel
Assistant Examiner — Evans Desrosiers
(74) Attorney, Agent, or Firm — Ziegler IP Law Group, LLC (57) ABSTRACT

Methods and apparatus are provided for cooperative file distribution with a target data delivery rate. A file is provided in a cooperative file distribution system by obtaining a target delivery rate for the at least one file; obtaining at least a portion of the file from one or more unreliable data sources at an unreliable data delivery rate; and obtaining at least a portion of the file from one or more reliable data sources based on a throttle rate if the unreliable data delivery rate is below the target delivery rate. The one or more unreliable data sources comprise one or more of a sender of the file and one or more peers. The one or more reliable data sources comprise one or more of one or more web servers and one or more storage proxies. The throttle rate can be adjusted to substantially maintain the target delivery rate. The target delivery rate can be dynamically determined based on one or more business rules.

22 Claims, 9 Drawing Sheets

TARGET DELIVERY RATE MAINTENANCE PROCESS – 600

610 — INITIALIZE "THROTTLE RATE" (DESIRED RATE TO RECEIVE DATA FROM THE RELIABLE SOURCE)

615 — WHENEVER A BLOCK ARRIVES FROM THE RELIABLE SOURCE:

620 — "DELTA TARGET" = TARGET RATE – MEASURED TOTAL DELIVERY RATE

625 — "DELTA SATURATION" = THROTTLE RATE – ACTUAL RELIABLE DELIVERY RATE

630 — SELECT SMALLER OF "DELTA TARGET" AND "DELTA SATURATION"

635 — ADJUST THROTTLE RATE – IF SELECTED DELTA IS NEGATIVE, THE THROTTLE RATE IS SET TOO HIGH; IF SELECTED DELTA IS POSITIVE, THE THROTTLE RATE IS TOO LOW.

640 — IF THE TOTAL DELIVERY RATE IS BELOW THE TARGET RATE, AND THE THROTTLE RATE IS AT OR NEAR ZERO, INCREASE THE THROTTLE RATE SLIGHTLY.

FIG. 7

TARGET < P2P

AVAILABLE BANDWIDTH DROPS

FIG. 13

AVAILABLE BANDWIDTH INCREASES

METHODS AND APPARATUS FOR COOPERATIVE FILE DISTRIBUTION WITH TARGET DATA DELIVERY RATE

CROSS-REFERENCE TO RELATED APPLICATIONS

The present application is related to U.S. patent application Ser. No. 11/096,193, entitled "Method and Apparatus for Offline Cooperative File Distribution Using Cache Nodes," and U.S. patent application Ser. No. 11/096,194, entitled "Method and Apparatus for Cooperative File Distribution in the Presence of Firewalls," each filed Mar. 31, 2005; U.S. patent application Ser. No. 11/150,532, entitled "System and Method for Multi-Channel Email Communication," filed Jun. 11, 2005; U.S. patent application Ser. No. 11/171,748, entitled, "System and Method for Distributed Multi-Media Production, Sharing and Low Cost Mass Publication," filed Jun. 30, 2005; and U.S. patent application Ser. No. 11/519,990, entitled, "Security Techniques for Cooperative File Distribution," filed Sep. 12, 2006, all incorporated by reference herein.

FIELD OF THE INVENTION

The present invention relates generally to communication methods and systems, and more particularly, to cooperative and secure methods and systems for sharing one or more files among users.

BACKGROUND OF THE INVENTION

The providers of popular, large digital files, such as software, music or video files, must keep pace with the ever increasing bandwidth demands for delivering such files. As the popularity of a file increases, a larger number of users are requesting the file and more bandwidth is required to deliver the file. With conventional Hypertext Transfer Protocol (HTTP) file delivery techniques, for example, the bandwidth requirements increase linearly with the number of requesting users, and quickly become prohibitively expensive.

A number of techniques have been proposed or suggested for reducing the bandwidth demands of file delivery on the server, using peer-to-peer content sharing. In a peer-to-peer content sharing model, often referred to as "cooperative distribution," one or more users that have downloaded one or more files from the server can share the file(s) with other users. A cooperative distribution model allows a server to deliver large files in a reliable manner that scales with the number of requesting users. Among other benefits, cooperative distribution models exploit the underutilized upstream bandwidth of existing users.

The BitTorrent™ file distribution system, described, for example, in http://www.bittorrent.com/documentation.html, or Bram Cohen, "Incentives Build Robustness in BitTorrent," http://www.bittorrent.com/bittorrentecon.pdf (May 22, 2003) is an example of a cooperative distribution technique. When multiple users are downloading the same file at the same time using the BitTorrent file distribution system, the various users upload pieces of the file to each other. In other words, a BitTorrent user trades pieces of a file that the user has with other required pieces that other users have until the complete file is obtained. In this manner, the cost of uploading a file is redistributed to the users of the file and the cost of hosting a popular file is more affordable. In addition, U.S. patent application Ser. No. 11/096,193, filed Mar. 31, 2005, entitled "Method and Apparatus for Offline Cooperative File Distribution Using Cache Nodes," discloses a cooperative file distribution system that uses one or more storage proxies to store the files that are being transferred among users.

While such cooperative file distribution systems provide an effective mechanism for distributing large files in a cost effective manner, they suffer from a number of limitations, which if overcome, could further improve the utility and efficiency of cooperative file distribution. In particular, it is difficult to guarantee a desired quality of service, such as a desired data delivery rate. A need therefore exists for improved cooperative file distribution systems that can satisfy a target data delivery rate. Yet another need exists for cooperative file distribution systems that supplement the peer-to-peer content sharing with more reliable data sources, such as web servers.

SUMMARY OF THE INVENTION

Generally, methods and apparatus are provided for cooperative file distribution with a target data delivery rate. According to one aspect of the invention, at least one file is provided in a cooperative file distribution system. An exemplary method comprises the steps of obtaining a target delivery rate for the at least one file; obtaining at least a portion of the file from one or more unreliable data sources at an unreliable data delivery rate; and obtaining at least a portion of the file from one or more reliable data sources based on a throttle rate if the unreliable data delivery rate is below the target delivery rate. The one or more unreliable data sources comprise one or more of a sender of the file and one or more peers. The one or more reliable data sources comprise one or more of one or more web servers and one or more storage proxies.

The throttle rate can be a desired rate to receive data from the unreliable data sources. An initial throttle rate is computed in one embodiment based on the target delivery rate and a current unreliable data delivery rate from the one or more unreliable data sources. The size and/or rate of requests for the portion of the file from the reliable data sources can be based on the throttle rate. The throttle rate can be adjusted to substantially maintain the target delivery rate. In addition, the throttle rate can be adjusted to avoid a saturation condition from the one or more reliable data sources. The target delivery rate can be dynamically determined based on one or more business rules.

A more complete understanding of the present invention, as well as further features and advantages of the present invention, will be obtained by reference to the following detailed description and drawings.

DETAILED DESCRIPTION

The present invention provides methods and apparatus for cooperative file distribution with a target data delivery rate. According to one aspect of the invention, the peer-to-peer content sharing is supplemented with data from one or more reliable data sources, such as web servers or content delivery networks (CDNs) that deliver data, for example, using the HTTP protocol. In this manner, a target data delivery rate can be achieved. According to a further aspect of the invention, a bandwidth targeting algorithm is disclosed that requests data from a reliable data source (e.g., a CDN) that can provide the data at very high data rates. Generally, the algorithm requests the data only as much as is needed to achieve the target delivery rate, without reducing the peer-to-peer data delivery rate. In this manner, various embodiments of the present invention maximize utilization of the lower cost unreliable data sources, and minimize the utilization of the reliable data sources.

According to further aspects of the present invention, the target bit rate can be dynamically determined based on, for example, recipient class of service, publisher class of service, content (e.g., match video encoding bit rate), user activity (e.g., deliver data as fast as needed if user is watching video or delivery more data more slowly and efficiently if user is not watching video), and other business rules (e.g., higher target bit rate for first week after content is released, then lower bit rate for "long tail" deliveries). According to another aspect of the invention, a plurality of web servers substantially simultaneously provide various portions of a given file to a single sender.

Figure 1:
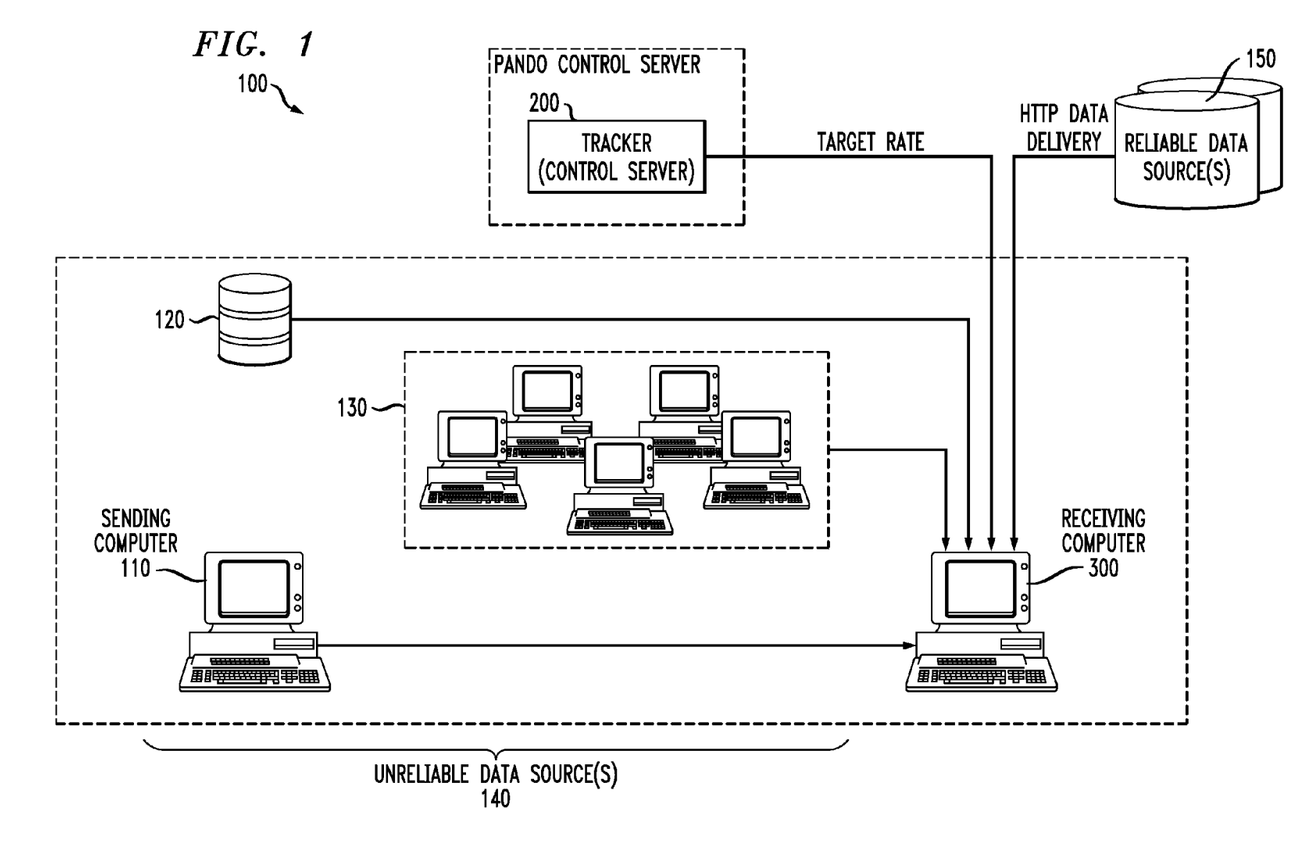
FIG. 1 illustrates a network environment in which the present invention can operate.

FIG. 1 illustrates a network environment in which the present invention can operate. As shown in FIG. 1, a sender 110, desiring to send one or more files to a receiver 300, discussed further below in conjunction with FIG. 3, uses a cooperative file distribution system 100. The cooperative file distribution system 100 may be implemented, for example, using the BitTorrent or Pando file distribution systems (or a combination thereof), as modified herein to provide the features and functions of the present invention. For a more detailed discussion of the BitTorrent file distribution system, see, for example, BitTorrent Protocol, http://www.bittorrent.com/protocol.html, or BitTorrent Guide, http://www.bittorrent.com/guide.html, each incorporated by reference herein. The Pando file distribution system may be implemented using Pando Platform 1.7.1.0 (downloadable from www.pando.com/download), as described in the Pando Users' Guide (www.pando.com/help), each incorporated by reference herein. Alternative systems include eDonkey and Gnutella.

As discussed hereinafter, the cooperative file distribution system 100 includes a tracker 200 that may be implemented using the tracker of the BitTorrent file distribution system, as modified herein to provide the features and functions of the present invention. In addition, the cooperative file distribution system 100 optionally employs one or more storage proxies 120, as described in U.S. patent application Ser. No. 11/096,193, entitled "Method and Apparatus for Offline Cooperative File Distribution Using Cache Nodes."

In a peer-to-peer content sharing model, often referred to as "cooperative distribution," one or more users that have downloaded a file from the server, often referred to as a swarm 130, can share the file with other users, such as the receiver 300. As previously indicated, the present invention supplements the peer-to-peer content sharing from one or more unreliable data sources 140, such as the sender 110 and swarm 130, with data from one or more reliable data sources 150, such as web servers or content delivery networks (CDNs) that deliver data, for example, using the HTTP protocol.

Figure 2:
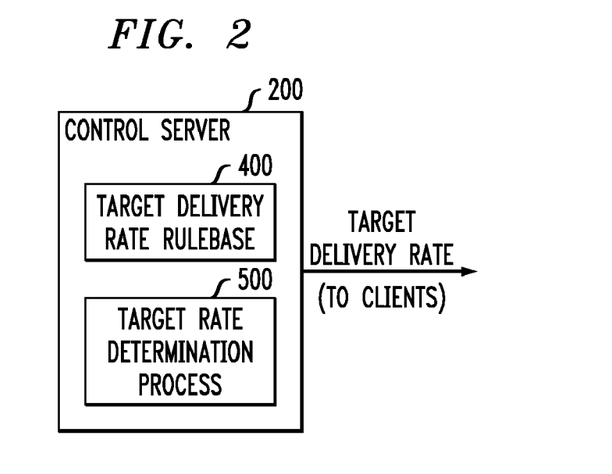
FIG. 2 is a schematic block diagram of an exemplary implementation of a control server incorporating features of the present invention.

FIG. 2 is a schematic block diagram of an exemplary implementation of a control server 200. Although shown only as a single server in FIG. 2, the control server 200 may optionally be implemented as a number of distinct servers, such as a separate tracker, services, and databases. See, for example, U.S. patent application Ser. No. 11/519,990, entitled, "Security Techniques for Cooperative File Distribution," filed Sep. 12, 2006.

As shown in FIG. 2 and discussed further below in conjunction with FIGS. 4 and 5, respectively, the exemplary control server 200 includes a target delivery rate rulebase 400 and a target rate determination process 500. Generally, the target rate determination process 500 dynamically determines the initial target rate for a client based on one or more exemplary business rules in the target delivery rate rulebase 400. The business rules may be based on, for example, one or more of recipient class of service, publisher class of service, content (e.g., match video encoding bit rate), and user activity (e.g., deliver data as fast as needed if user is watching video or delivery more data more slowly and efficiently if user is not watching video).

Figure 3:
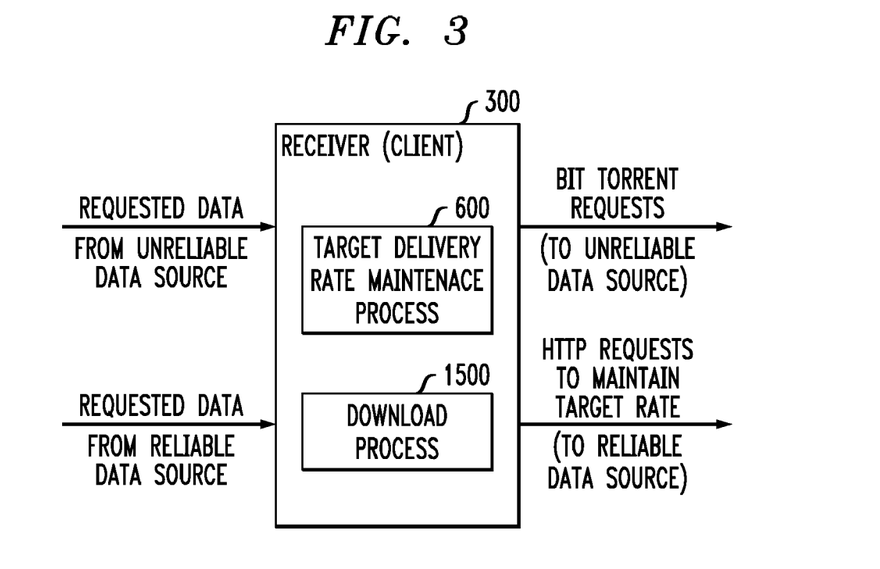
FIG. 3 is a schematic block diagram of an exemplary implementation of a receiver of FIG. 1.

FIG. 3 is a schematic block diagram of an exemplary implementation of a receiver 300 of FIG. 1. As shown in FIG. 3 and discussed further below in conjunction with FIGS. 6 and 15, respectively, the exemplary receiver (client) 300 includes a target delivery rate maintenance process 600 and a download process 1500. Generally, the client 300 implements the exemplary target delivery rate maintenance process 600 to calculate a target delivery rate based on the target rate (received from the control server 200) and the client's current rate from the one or more unreliable data sources 140. The target delivery rate maintenance process 600 then modifies the throttle rate to try to match the given target rate. The modified throttle rate is then used by the client 300 to determine the size and rate of HTTP requests for portions of the file.

Figure 4:
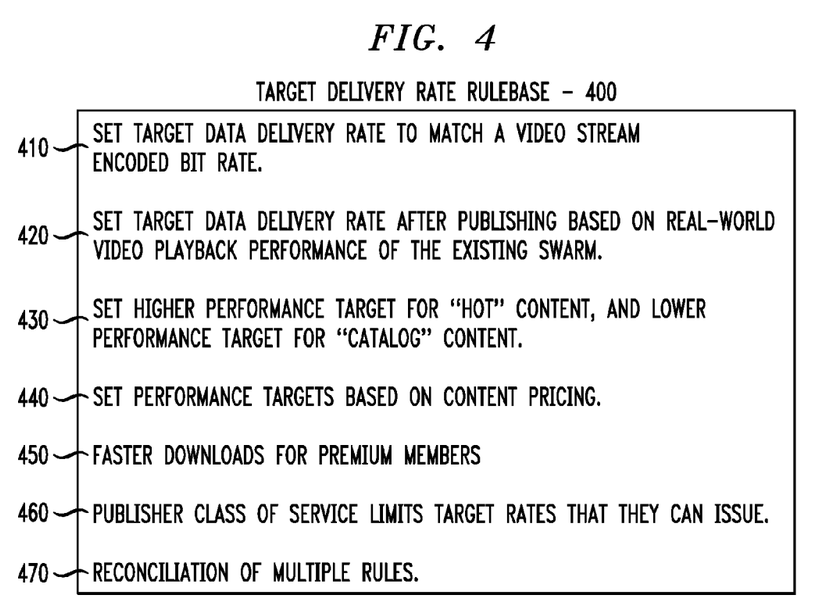
FIG. 4 is a sample table from an exemplary implementation of the target delivery rate rulebase of FIG. 2.

FIG. 4 is a sample table from an exemplary implementation of the target delivery rate rulebase 400. As shown in FIG. 4, the exemplary target delivery rate rulebase 400 includes a number of business rules that determine the initial target rate for a file. For example, as shown in FIG. 4, an exemplary rule 410 allows a publisher to set the target data delivery rate to match the encoded bit rate of a video stream. In this manner, the user gets smooth playback (i.e., enough data) without the publisher wasting money (i.e., delivering a faster bit rate than needed, using the CDN).

A rule 420 allows a publisher to set the target data delivery rate after publishing. For example, the publisher can publish all files, then go back and set target bit rates based on real-world video playback performance of the existing swarm 130. For example, if playback is inconsistent, the target delivery rate can be increased until playback is smooth, without re-publishing the content.

A rule 430 allows a publisher to set a higher performance target for "hot" content, and lower performance target for "catalog" content. Content can dynamically move between "hot" and "catalog" characterizations based on well-known business rules, such as aging, sales rate and promotions.

A rule 440 allows a publisher to set performance targets based on content pricing. For example, premium content can be assigned a faster/higher delivery cost, and discounted content can be assigned a slower/lower delivery cost. Similarly, rule 450 allows downloaders with premium memberships to obtain faster downloads than non-members. For example, free service members might receive a 50 KBps target delivery rate, while paid members might receive a 150 KBps target delivery rate.

A rule 460 allows a publisher class of service to limit target rates that they can issue. For example, while a particular video may be encoded at 1 Mbps, and configured for a 1 Mbps target rate, if the video was published by a discounted publisher account, client download targets might be limited to 500 Kbps. If the publisher upgrades the account, the video's target rate could be raised dynamically to 1 Mbps.

A rule 470 allows multiple business rules to be reconciled or prioritized. For example, if a publisher requests a 1 Mbps target rate for a video using a discounted publishing account that is limited to 500 Kbps, but the downloader happens to be a premium member, the downloader could still receive the 1 Mbps rate instead of the 500 Kbps rate.

While the exemplary target delivery rate rulebase 400 shown in FIG. 4 illustrates server-side business rules, one or more client-side business rules (i.e., whether the client decides to hit the target) can also be employed. For example, if the download is automatic and the user is not watching (e.g., RSS downloads at night) the client 300 targets a minimal performance target (e g, 1 KB/s or another rate provided by the server) instead of the server-directed target, in order to maximize deliver efficiency. The server could also provide various performance target delivery rates for various user states (such as active use or automated use).

Figure 5:
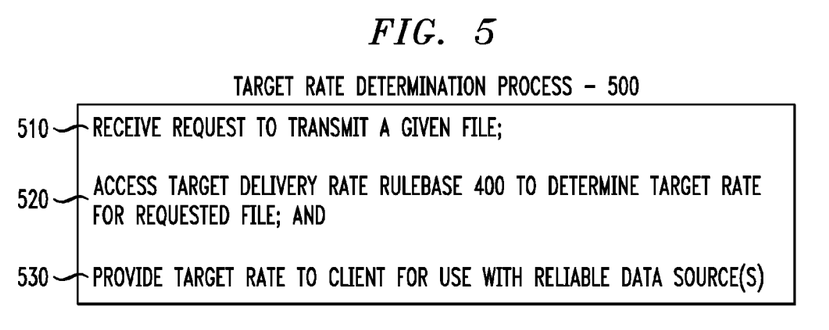
FIG. 5 illustrates exemplary pseudo code for the target rate determination process of FIG. 2.

FIG. 5 illustrates exemplary pseudo code for the target rate determination process 500 of FIG. 2. As shown in FIG. 5, the exemplary target rate determination process 500 initially receives a request during step 510 to transmit a given file. Thereafter, during step 520, the target rate determination process 500 accesses the target delivery rate rulebase 400 to dynamically determine a target rate for the requested file. Finally, during step 530, the determined target rate is provided to the appropriate client(s) for use with the reliable data source(s), if necessary.

Figure 6:
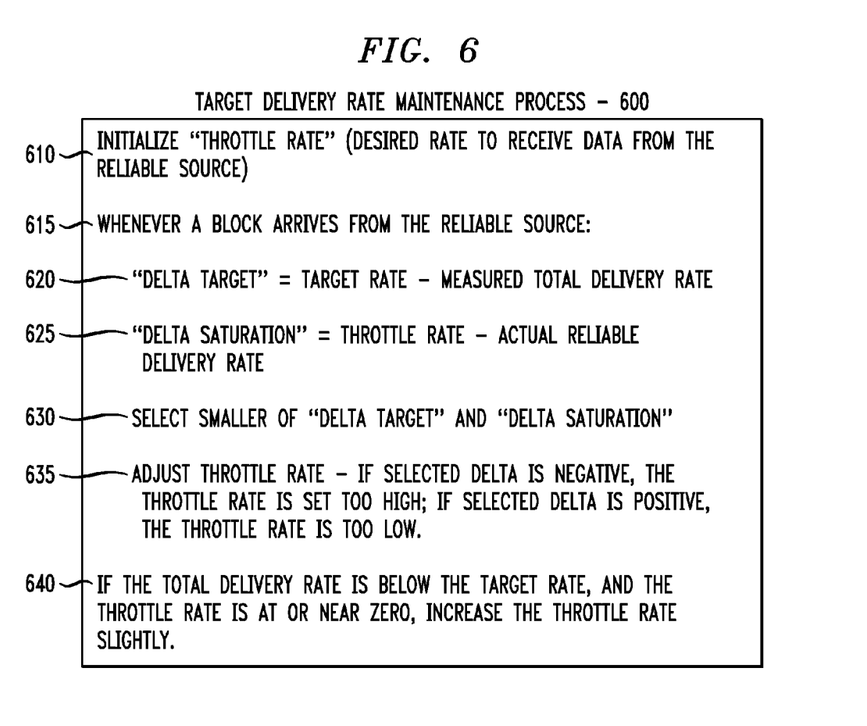
FIG. 6 illustrates exemplary pseudo code for the target delivery rate maintenance process of FIG. 3.

FIG. 6 illustrates exemplary pseudo code for the target delivery rate maintenance process 600 of FIG. 3. Generally, the client 300 implements the exemplary target delivery rate maintenance process 600 to calculate an initial throttle rate based on the target rate (received from the control server 200) and the client's current rate from the one or more unreliable data sources 140. The target delivery rate maintenance process 600 then modifies the throttle rate to try to match the given target rate. The modified throttle rate is then used by the client 300 to determine the size and rate of HTTP requests for portions of the file.

As shown in FIG. 6, the exemplary target delivery rate maintenance process 600 initially selects an initial "throttle rate" (i.e., the desired rate to receive data from the reliable source) during step 310, based on the target rate set by the control server 200. For example, the rate may be set to the target rate minus the swarm 130 delivery rate.

Thereafter, during step 615, whenever a block arrives from the reliable source, steps 620-635 are performed. During step 620 a "delta target" value is calculated as the difference between the target rate and the measured total delivery rate.

During step 625, a "delta saturation" value is calculated as the difference between the throttle rate and the actual reliable delivery rate (based on the number of bytes requested from the reliable source, the start time of the request, and the end time of the request).

During step 630, the smaller of the "delta target" and "delta saturation" values is selected. Finally, during step 635, the throttle rate is adjusted accordingly. For example, if the selected delta value is negative, the throttle rate is set too high (e.g., either the available bandwidth is being saturated, or the data is running faster than the target rate). Likewise, if the selected delta value is positive, the throttle rate is set too low.

In addition, step 640 is performed at fairly long intervals. During step 640, if the total delivery rate is below the target rate, and the throttle rate is at or near zero, then the throttle rate is increased slightly. Since the above calculation (steps 620-635) is performed only when blocks arrive, step 640 keeps the algorithm 600 from choking the reliable source permanently. The frequency with which the check is performed in step 640 is based on the period that the rate measurements are performed In one exemplary implementation, the measurement period is currently 20 seconds and the check in step 640 is performed every 10 seconds. In a further variation, the check in step 640 can be performed whenever the total delivery rate drops by some amount.

The throttle rate can be adjusted during step 635, for example, by adding a proportion of the selected delta to the throttle rate. In one exemplary implementation, the new throttle rate is calculated as follows:

$$\text{new throttle rate}=0.8*\text{delta}+\text{old throttle rate}.$$

In further variations, the throttle rate can be adjusted based on, for example, other proportions of the delta, the integral of the delta, and the derivative of the delta.

Figure 7:
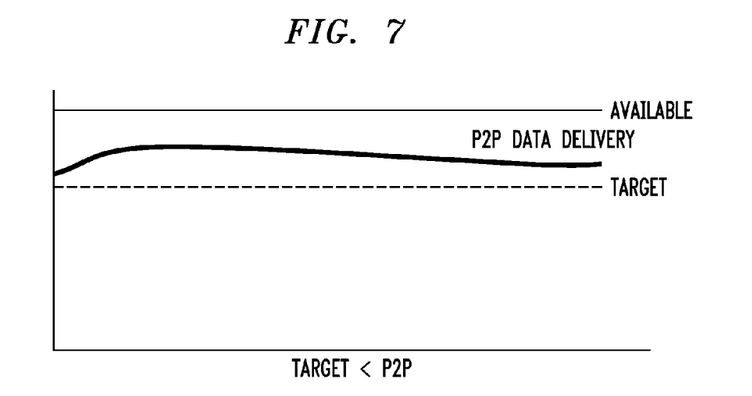
FIGS. 7 through 14 illustrate various exemplary scenarios that may be encountered when adjusting the target rate in accordance with the present invention.

FIGS. 7 through 14 illustrate various exemplary scenarios that may be encountered when adjusting the target rate in accordance with the present invention. In the scenario of FIG. 7, the data delivery rate from the unreliable data sources 140 (such as p2p) exceeds the specified target delivery rate. Thus, no data is required from the reliable data sources 150.

Figure 8:
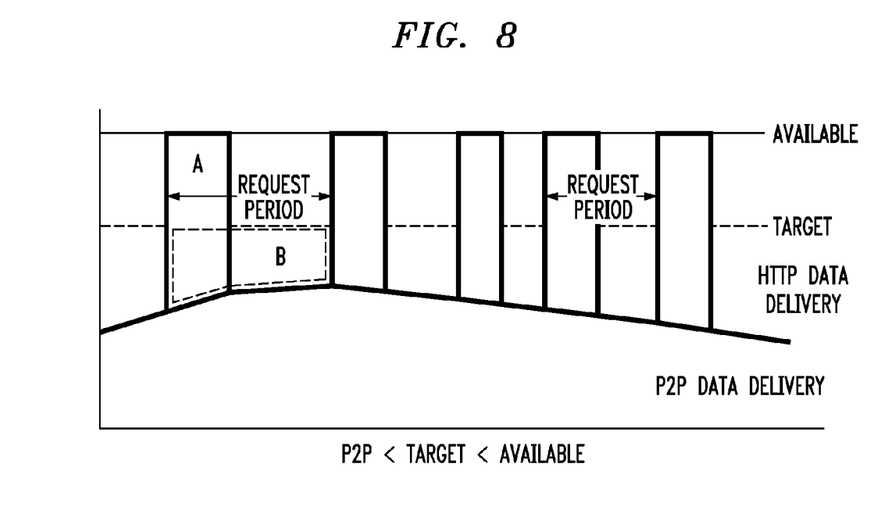

In FIG. 8, the data delivery rate from the unreliable data sources 140 (such as p2p) is less than the target data delivery rate, but there is sufficient available client bandwidth to reach the target rate using requests from the reliable data sources 150. In the example of FIG. 8, the target delivery rate maintenance process 600 issues repeating data requests for blocks of data, with the blocks having a constant data size but a variable request timing. It is noted that the block size could also vary, or the request time could remain constant, as would be apparent to a person of ordinary skill in the art.

As shown in FIG. 8, the volume of data requested (B) and the timing of the next request ("request period"), are calculated so that the area of "B" fills the area between the current data delivery rate from the unreliable data sources 140 and the current target data delivery rate. When the request is issued, the request is satisfied more rapidly than the target rate (area A), leaving a gap of slower data delivery before the next request. The result is that the average data delivery rate is approximately the target data delivery rate. It is noted that the data delivery rate from the unreliable data sources 140 can vary over time, causing the request period to vary in order to maintain a constant average data delivery rate. It is further noted that while the additional data delivery from the reliable data sources 150 is labeled "HTTP data delivery" in FIG. 8, it can be transmitted over any protocol, from any data source.

Figure 9:
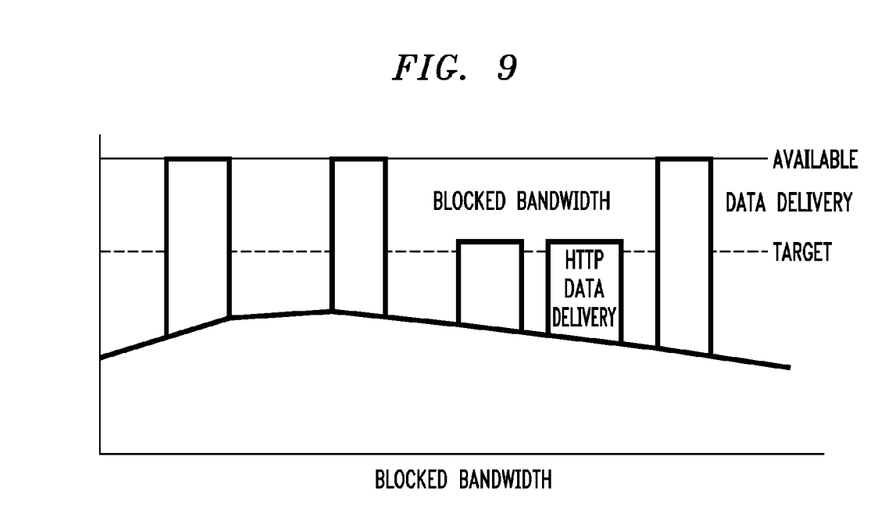

FIG. 9 illustrates the impact of a variation in the available bandwidth. The bandwidth that is available for a file transfer can be reduced, for example, due to another application on the computer, or another application on another computer on a shared network, or a change in the network environment. The impact of this bandwidth reduction is that the HTTP requests from the reliable data sources 150 are "shorter and wider," but with unchanged "area," meaning that the same average data rate is transmitted.

Figure 10:
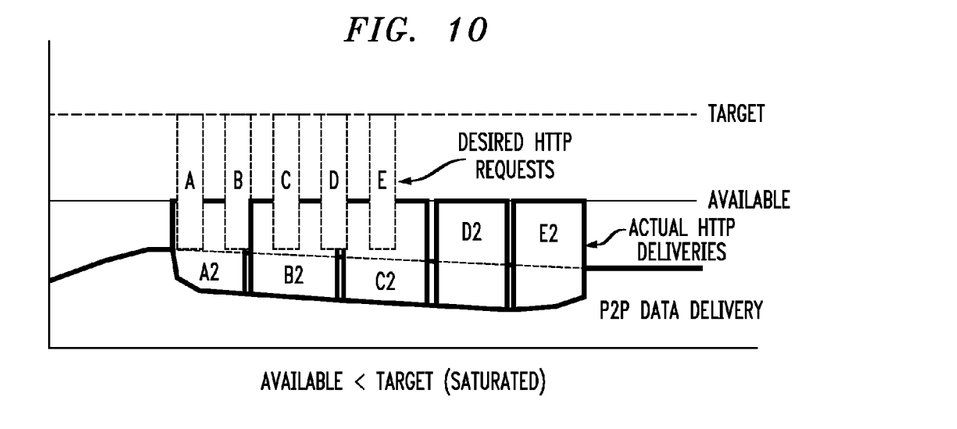

FIG. 10 illustrates a scenario where the available bandwidth is insufficient to satisfy the target data delivery rate. FIG. 10 illustrates the impact of attempting to request more data than can be delivered. In FIG. 10, the client 300 is issuing HTTP requests (A, B, C, D, E) more rapidly than the data can be delivered (A2, B2, C2, D2, E2). Thus, the HTTP data from the reliable data sources 150 displaces the p2p data from the swarm 130, reducing the data delivery rate from the unreliable data sources 140 substantially.

Figure 11:
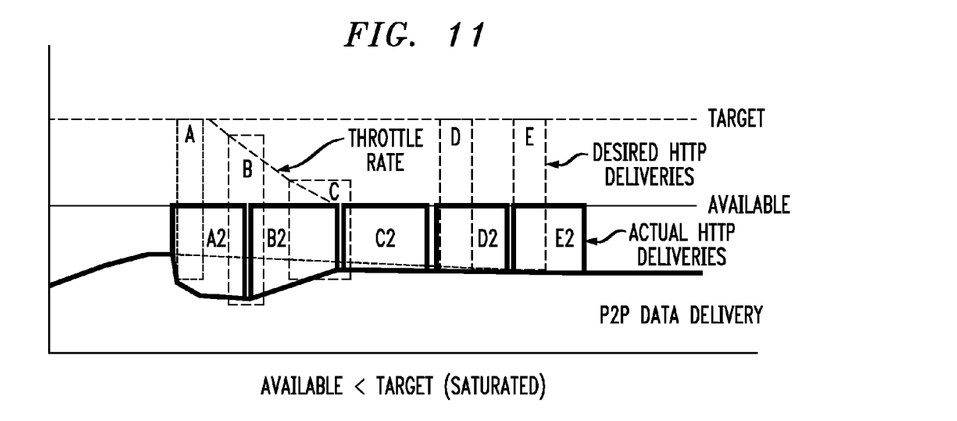

In the scenario of FIG. 11, the target data delivery rate is again higher than the available bandwidth. The algorithm 600 introduces a new variable, the 'desired' data delivery rate. The desired data delivery rate is initially the same as the target delivery rate, but when the algorithm 600 detects that the connection is saturated, the desired data delivery rate is dropped until the connection is no longer saturated, and when the connection has available bandwidth, it is raised until either the target rate is achieved or the connection is saturated.

The algorithm 600 detects that the connection is saturated, for example, when the actual HTTP delivery completes after the desired start time of the following HTTP delivery, indicating that the connection could not deliver the requested data in the required period of time to achieve the target data delivery rate. For example, when the second request (B2) is unable to be issued when scheduled (B), and when the third request (C2) is unable to be issued when scheduled (C), this causes the desired delivery rate to drop. As the desired delivery rate drops, the request period gets longer, until eventually the request period is slightly longer than the time required to satisfy each request, allowing the actual request times (D2, E2) to be satisfied by the requests (D, E).

Figure 12:
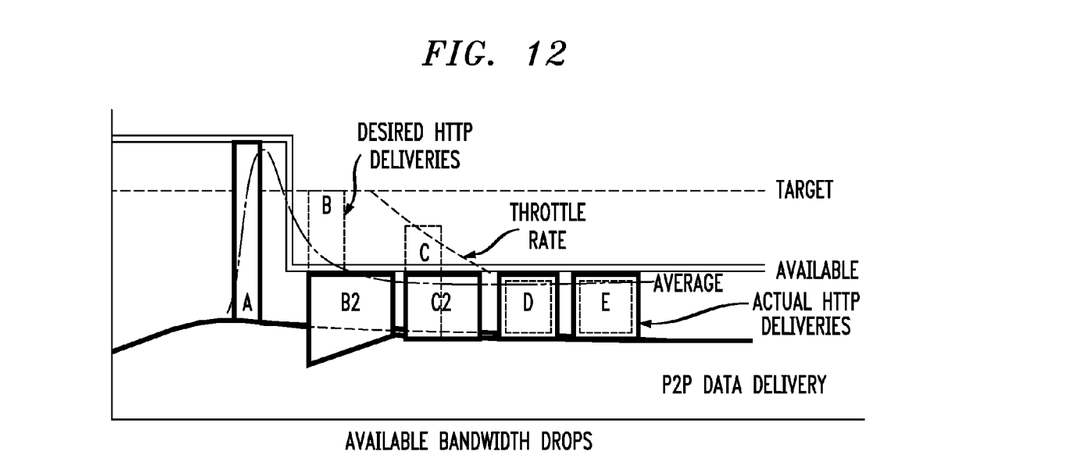

FIG. 12 illustrates a scenario where the algorithm 600 adapts to a decrease in available bandwidth, causing the available bandwidth to be below the target. This could be caused, for example, by a change in network environment, or another application on the computer consuming network resources. It is noted that the data delivery from the swarm 130 is only impacted for the first block(s) retrieved after the decrease in available bandwidth. Once the algorithm 600 has adapted, the p2p delivery from the swarm 130 can continue with minimal impact from the HTTP delivery from the reliable data sources 150.

Figure 13:
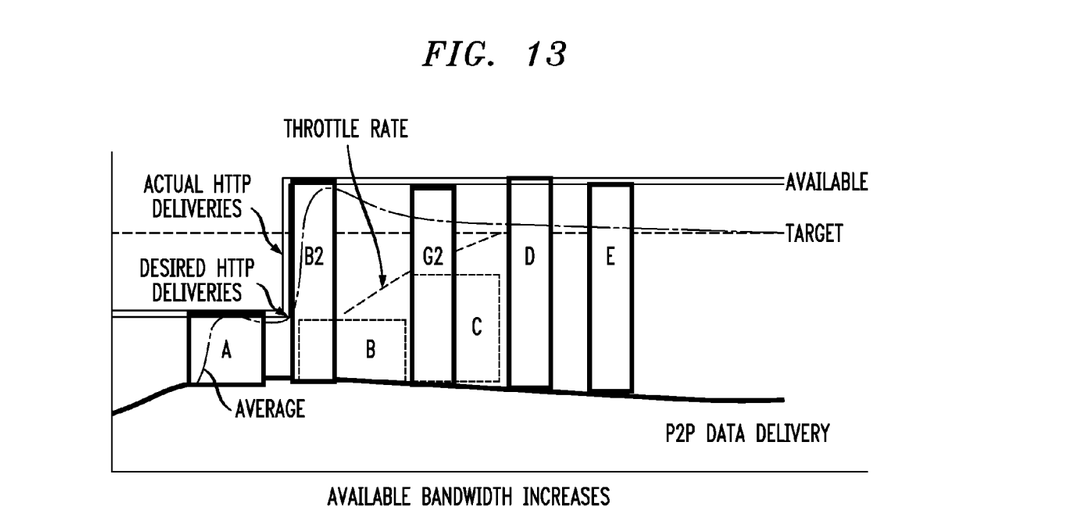

FIG. 13 illustrates a scenario where the algorithm 600 adapts to an increase in available bandwidth. It is noted that the desired data delivery rate increases gradually. Thus, the average actual delivery rate may be somewhat below the target for the first few file portions downloaded after the increase in available bandwidth.

Figure 14:
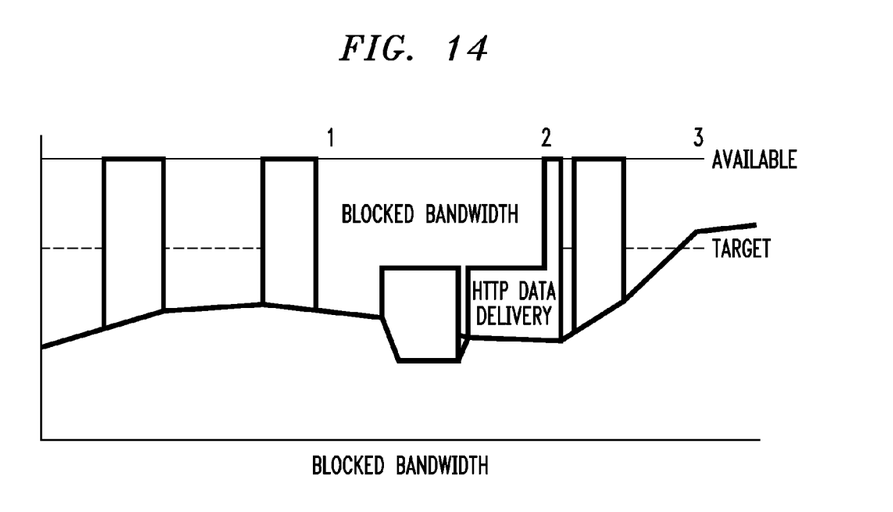

FIG. 14 illustrates the algorithm 600 adapting to dynamically changing conditions. As shown in FIG. 14, the initial condition allows for the algorithm to satisfy the target data delivery rate by requesting some data via HTTP from the reliable data sources 150. Then, at a time (1), the available bandwidth drops, causing the connection to be saturated. The algorithm 600 adapts by requesting less data, allowing the p2p data delivery from the swarm 130 to recover. Then, at a time (2), the available bandwidth is restored, allowing for the transfer to achieve the target data delivery rate. Finally, at a time (3), the data delivery rate from the unreliable data sources 140 increases, so the algorithm 600 stops requesting data via HTTP from the reliable data sources 150.

Figure 15:
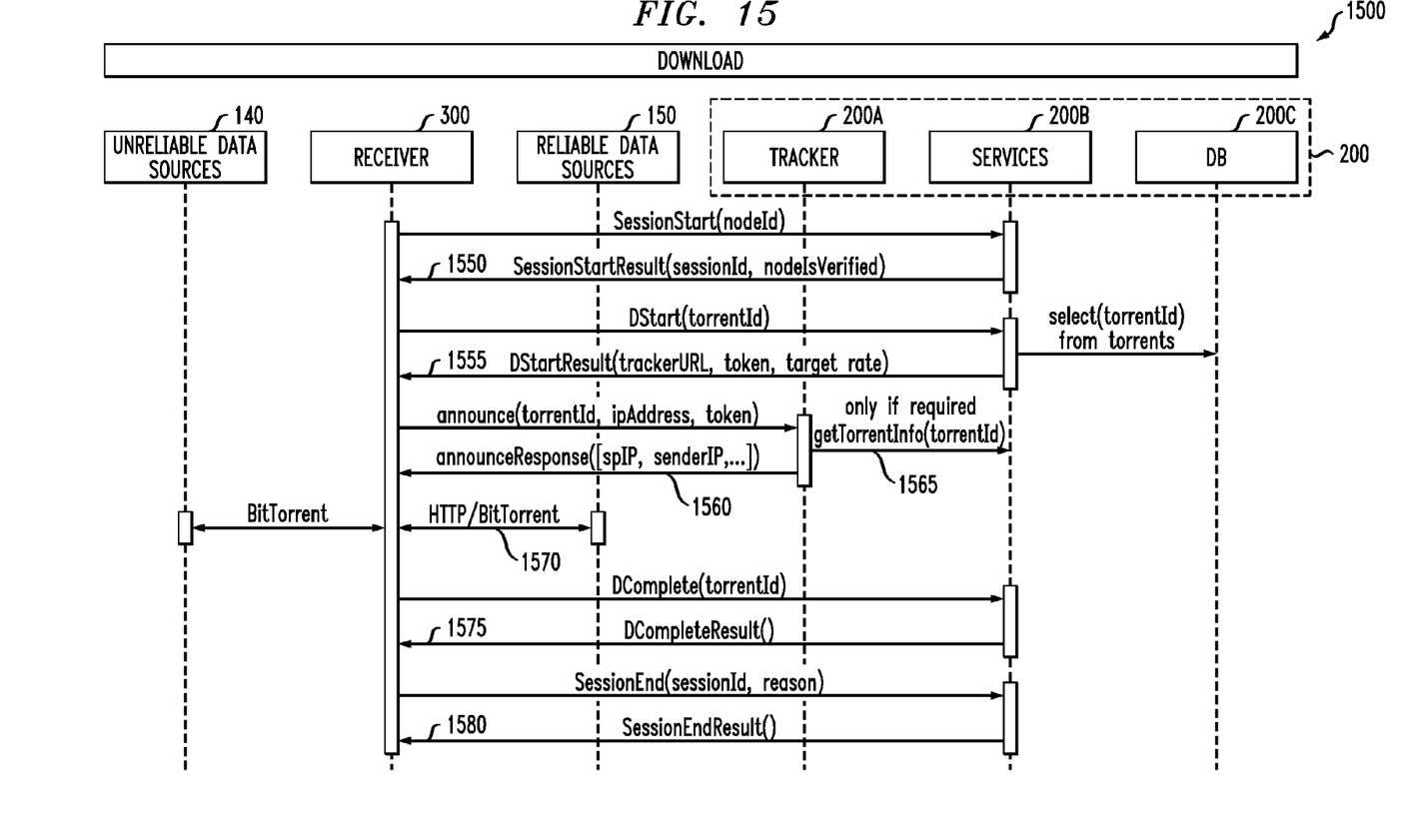
FIG. 15 is a communication sequence diagram in accordance with a UML notation, illustrating exemplary communications and other processing performed by the various entities of FIG. 1 for downloading content in the cooperative file sharing system of the present invention.

FIG. 15 is a communication sequence diagram 1500 in accordance with a UML notation, illustrating exemplary communications and other processing performed by the various entities of FIG. 1 for downloading content in the cooperative file sharing system 100. As indicated above, although shown only as a single server in FIG. 2, the control server 200 may optionally be implemented as a number of distinct servers, such as a separate tracker 200A, services 200B, and databases 200C, as shown in FIG. 15.

As shown in FIG. 15, the downloading process 1500 is initiated using a session start message exchange 1550 between the receiver 300 and the services processor 200B. The receiver 300 optionally provides a node identifier, and the services processor 200B determines if the receiver 300 has the appropriate permissions to receive the desired file(s). If the receiver 300 is approved, the receiver 300 receives a "session start result" message containing, for example, a session identifier, and indication that the receiver node was verified. In one implementation, the services processor 200B can control authentication and database access.

After the receiver 300 is validated by the message exchange 1550, the receiver 300 attempts to start a download using message exchange 1555. Generally, the receiver 300 sends a "download start" message to the services processor 200B. Upon identifying the reliable data sources 150 associated with the desired file (if any), the services processor 200B will store the information in the database 200C and provide the result to the receiver 300, with an identification of the assigned tracker 200A, a token and the determined target delivery rate. Generally, tracker tokens are optionally used to control access and use of the tracker 200A, without requiting further database access. The token is a key that can be decrypted by the tracker 200A. Among other information, the token contains the last torrent update time. The receiver is optionally provided with the address of reliable data source (s), such as by an HTTP URL. In one implementation, the HTTP URL is provided in the response to the DStart message, and not in the tracker response. In further variations, the reliable data source addresses can be provided in other communications mechanisms (e.g., encoded in the Pando file, transmitted in the DStart response, and transmitted by the Tracker).

After the receiver 200 is notified of the tracker 200A assigned to the bit torrent, the receiver 300 announces his or herself to the tracker 200A, during a message exchange 1560. As shown in FIG. 15, the receiver 300 sends an announce message to the tracker 200A. The announce message includes the assigned token, which allows the tracker 200A to validate the receiver 300. The announce message will trigger the tracker 200A to execute an announce interval computation process. In addition, based on the torrent update time included in the token, the tracker 200A may be required to communicate with the services processor 200B to obtain (update) the torrent information, using the torrent identifier, during a message exchange 1565.

After implementing the announce interval computation process, the tracker 200A will send an announce response to the receiver 300. The announce response includes a listing of the storage proxy 120 and sender 110 associated with the file(s) (such as unreliable data sources 140 and reliable data sources 150), as well as the assigned announce interval.

During message exchange 1570, the receiver 300 attempts to download the file from the unreliable data sources 140, such as the sender 110 or swarm 130. Likewise, if necessary to maintain the target data rate, the receiver 300 can download portions of the file from the reliable data sources 150, such as web servers or storage proxies, based on the throttle rate determined by the target delivery rate maintenance process 600. Thereafter, during message exchange 1575, the receiver 300 notifies the services processor 200B that the downloading is complete. Finally, the session is terminated during a message exchange 1580 between the receiver 300 and the services processor 200B.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for obtaining at least one file in a cooperative file distribution system, comprising:
    obtaining a target delivery rate for said at least one file;
    identifying one or more unreliable data sources and one or more reliable data sources to transfer at least a portion of said at least one file to a client, wherein each unreliable data source is associated with a lower cost, a lower availability and a lower reliability of performance than each reliable data source and wherein said identification step is performed by said client;
    obtaining at least a portion of said file at a receiver from one or more of said identified unreliable data sources at an unreliable data delivery rate;
    obtaining at least a portion of said file at said receiver from one or more of said identified reliable data sources based on a throttle rate when said unreliable data delivery rate is below said target delivery rate, wherein a size or rate of requests for the portion of the file from the one or more reliable data sources are based on the throttle rate;
    adjusting said throttle rate such that an amount of data obtained from said reliable data sources is reduced and said target delivery rate is maintained;
    detecting rate saturation by comparing said throttle rate to an actual rate of data received from said reliable data sources; and
    reducing said throttle rate when rate saturation is detected, wherein at least one of said identified unreliable data sources is provided by an entity distinct from a provider of at least one of said identified reliable data sources, and wherein said throttle rate is based on a combined delivery rate from said identified unreliable data sources and said identified reliable data sources, and wherein said combined delivery rate is monitored at said receiver.

2. The method of claim 1, wherein said one or more unreliable data sources comprise one or more of a sender of said file and one or more peers.

3. The method of claim 1, wherein said one or more reliable data sources comprise one or more of one or more web servers and one or more storage proxies.

4. The method of claim 3, wherein a plurality of servers provide various portions of said file to a single sender.

5. The method of claim 1, wherein said throttle rate is a desired rate to receive data from said unreliable data sources.

6. The method of claim 1, further comprising the step of computing an initial throttle rate based on said target delivery rate and a current unreliable data delivery rate from said one or more unreliable data sources.

7. The method of claim 1, further comprising the step of dynamically adjusting said throttle rate.

8. The method of claim 1, wherein said throttle rate is adjusted to maintain said target delivery rate.

9. The method of claim 1, wherein said throttle rate is adjusted to avoid a saturation condition from said one or more reliable data sources.

10. The method of claim 9, wherein said saturation condition occurs when requested data is not delivered in a period of time sufficient to achieve said target delivery rate.

11. The method of claim 1, wherein said target delivery rate is adjusted after publishing based on one or more business rules selected from the group comprising: setting the target rate based on real-world playback performance of the existing swarm, setting a higher target rate for hot content, setting a lower target rate for catalog content, set target rate based on content pricing, set a higher target rate for a premium member, set target rate based on a publisher's class of service.

12. The method of claim 11, wherein said one or more business rules includes a reduction of a cost of delivering said file.

13. A system for obtaining at least one file in a cooperative file distribution system, comprising:
    a memory; and
    at least one processor, coupled to the memory, operative to:
    obtain a target delivery rate for said at least one file;
    identify one or more unreliable data sources and one or more reliable data sources to transfer at least a portion of said at least one file to a client, wherein each unreliable data source is associated with a lower cost, a lower availability and a lower reliability of performance than each reliable data source and wherein said identification step is performed by said client;
    obtain at least a portion of said file at a receiver from one or more of said identified unreliable data sources at an unreliable data delivery rate; and
    obtain at least a portion of said file at said receiver from one or more of said identified reliable data sources based on a throttle rate when said unreliable data delivery rate is below said target delivery rate, wherein a size or rate of requests for the portion of the file from the one or more reliable data sources are based on the throttle rate;

adjusting said throttle rate such that an amount of data obtained from said reliable data sources is reduced and said target delivery rate is maintained;

detecting rate saturation by comparing said throttle rate to an actual rate of data received from said reliable data sources; and reducing said throttle rate when rate saturation is detected, wherein said at least one of said identified unreliable data sources is provided by an entity distinct from a provider of at least one of said identified reliable data sources and wherein said throttle rate is a rate monitored at said receiver and is based on a combined delivery rate from said identified unreliable data sources and said identified reliable data sources.

14. The system of claim 13, wherein said one or more unreliable data sources comprise one or more of a sender of said file and one or more peers.

15. The system of claim 13, wherein said one or more reliable data sources comprise one or more of one or more web servers and one or more storage proxies.

16. The system of claim 13, wherein said throttle rate is a desired rate to receive data from said unreliable data sources.

17. The system of claim 13, wherein said processor is further configured to compute an initial throttle rate based on said target delivery rate and a current unreliable data delivery rate from said one or more unreliable data sources.

18. The system of claim 13, wherein said throttle rate is adjusted to maintain said target delivery rate.

19. The system of claim 13, wherein said throttle rate is adjusted to avoid a saturation condition from said one or more reliable data sources.

20. The system of claim 13, wherein said target delivery rate is adjusted after publishing based on one or more business rules selected from the group comprising: setting the target rate based on real-world playback performance of the existing swarm, setting a higher target rate for hot content, setting a lower target rate for catalog content, set target rate based on content pricing, set a higher target rate for a premium member, set target rate based on a publisher's class of service.

21. The method of claim 20, wherein said one or more business rules includes a reduction of a cost of delivering said file.

22. An article of manufacture for obtaining at least one file in a cooperative file distribution system, comprising a non-transitory machine readable storage medium comprising one or more program instructions which when executed implement the steps of:

obtaining a target delivery rate for said at least one file;

identifying one or more unreliable data sources and one or more reliable data sources to transfer at least a portion of said at least one file to a client, wherein each unreliable data source is associated with a lower cost, a lower availability and a lower reliability of performance than each reliable data source and wherein said identification step is performed by said client;

obtaining at least a portion of said file at a receiver from one or more of said identified unreliable data sources at an unreliable data delivery rate; and obtaining at least a portion of said file at said receiver from one or more of said identified reliable data sources based on a throttle rate when said unreliable data delivery rate is below said target delivery rate, wherein a size or rate of requests for the portion of the file from the one or more reliable data sources are based on the throttle rate;

adjusting said throttle rate such that an amount of data obtained from said reliable data sources is reduced and said target delivery rate is maintained;

detecting rate saturation by comparing said throttle rate to an actual rate of data received from said reliable data sources; and reducing said throttle rate when rate saturation is detected, wherein said at least one of said identified unreliable data sources is provided by an entity distinct from a provider of at least one of said identified reliable data sources and wherein said throttle rate is a rate monitored at said receiver and is based on a combined delivery rate from said identified unreliable data sources and said identified reliable data sources.

* * * * *